(12) United States Patent
Ramsey

(10) Patent No.: US 6,435,735 B1
(45) Date of Patent: Aug. 20, 2002

(54) ASSEMBLING OPTICAL COMPONENTS

(75) Inventor: David A. Ramsey, Annandale, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/577,186

(22) Filed: May 23, 2000

(51) Int. Cl.[7] .................................................. G02B 6/36
(52) U.S. Cl. ........................................... 385/90; 385/91
(58) Field of Search ............................. 385/90, 91, 92, 385/93

(56) References Cited

U.S. PATENT DOCUMENTS 5,916,458 A * 6/1999 Komoriya et al. ............. 385/93
6,234,688 B1 * 5/2001 Boger et al. ................... 385/92

* cited by examiner

*Primary Examiner*—Georgia Epps
*Assistant Examiner*—Alicia M. Harrington
(74) *Attorney, Agent, or Firm*—Peter V. D. Wilde; Thomas, Kayden, Horstemeyer & Risley LLP

(57) ABSTRACT

The specification describes an alignment and attachment process for coupling optical components, such as lasers and photodiodes, to fiber pigtails. The alignment function is shared between two separate pieces of equipment, an alignment tool, and an alignment/attachment tool. Throughput for the alignment/attachment tool, typically an expensive tool, is increased by performing preliminary alignments using the less expensive alignment tool. The preliminary alignment generates coordinates for the position of the optical axis in optical components. These coordinates are transferred to the alignment/attachment tool thus reducing the portion of the time budget in the alignment/attachment apparatus that needs to be devoted to the alignment function. Thus at least a part of the time consuming alignment operations are done in parallel with the alignment/attachment process.

8 Claims, 4 Drawing Sheets

ASSEMBLING OPTICAL COMPONENTS

FIELD OF THE INVENTION

This invention relates to methods for assembly of optical components and more particularly to techniques for coupling optical waveguide components together with precision alignment.

BACKGROUND OF THE INVENTION

Assembly of optical devices requires precise alignment of the optical paths, typically waveguides, to avoid signal or power loss. Optical fiber to fiber splices are relatively straightforward and couplers and splice techniques have been developed which provide high strength, low loss splices. Coupling of an optical fiber to a source or detector is typically more demanding. This a partly due to the uncertainty of the position of the optical axis in the source/detector package. The source is usually a laser diode with a lens or lens system to focus the output beam to an exit point in the laser package. The detector package is similar but with a photodetector in place of the laser. In this description, and for the purpose of this invention, these elements will be treated as interchangeable. The term s/d is intended to refer to either package. The problem of aligning the core of the optical fiber to the s/d module is essentially the same in both cases.

A positive aspect of this coupling problem is that the laser or photodetector allows a convenient means for active alignment. If the coupler is from a laser package to a fiber pigtail, the fiber pigtail can be attached temporarily to a photodetector. The laser is activated and the fiber pigtail moved to the position of optimum power output. If the coupler is between a fiber pigtail and a photodetector package, the fiber is temporarily attached to a light source and the fiber again moved to the position of maximum photodetector output.

Permanent coupling of the optical components is typically effected by welding the container of the s/d module to a metal sleeve at the end of the fiber pigtail. The end of the optical fiber is typically fitted with a glass or ceramic ferrule, and the ferrule is inserted into an intermediate metal sleeve and bonded to the sleeve using e.g. epoxy. The intermediate sleeve is in turn fitted with a z-sleeve into which the intermediate sleeve is inserted temporarily until later permanently attached in the final alignment stage. It is important that the attachment between the optical fiber pigtail and the s/d module be reliable and permanent. Welding is a suitable approach. It is preferred that the metal used for the ferrule sleeve be thermo-mechanically compatible with the metal used for the portion of the s/d container to which it is attached. Welding is preferably performed using laser welding equipment. Two or more laser spot welders are typically incorporated in the coupling apparatus and positioned to weld suitable points on the periphery of the ferrule assembly to the edges of an opening in the s/d container.

It is critical for optimum package performance for the optical path in the waveguide of the fiber pigtail, i.e. the fiber core, to be precisely aligned with the optical path in the s/d module. Adjustment of the relative position of the two optical paths may be in any of the X, Y, or Z planes. The X-Y adjustment is for aligning the core of the fiber with the optical axis in the laser or photodetector. The Z-axis adjustment is used for optimizing the focus for the s/d module optics. This three-axis alignment poses a technological challenge for optical package designers. Many alignment techniques have been proposed and used. The successful ones are relatively complex, and use expensive micromechanics, and sophisticated computers and software. Consequently, a state of the art welding tool for this alignment and attachment process is expensive. In addition to the capital cost of the equipment, the alignment itself is time consuming, and throughput becomes an important cost issue. Enhancing throughput thus far has been addressed by adding more alignment/welding machines to the operation. However, this requires extensive investment of capital for additional equipment. The time budget for the equipment is heavily loaded toward the alignment operation prior to the actual attachment step. Ways to accelerate this phase of the process could result in large savings in the overall cost of assembly.

STATEMENT OF THE INVENTION

I have developed a new approach to the throughput problem for active alignment tools. Heretofore it has been assumed that the alignment and attachment operations in an active alignment tool are inextricably joined by the nature of the process. However, contrary to that thinking, a portion of the alignment operation can be done independently of the actual attachment tool. Using this approach, a pre-alignment step is employed to greatly reduce the alignment time consumed by the welding tool. The pre-alignment step is performed with relatively simple auxiliary alignment apparatus (AAA). Thus parallel processing is employed, but the equipment required for the added parallel steps is relatively less expensive. The pre-alignment (AAA) provides X-Y data for the position of the optical axes in the s/d module and the optical fiber pigtail. This data is fed to the main alignment/welding apparatus (AWA) thus providing a "head start" for the AWA and reducing the overall processing time compared with the conventional serial step process. If desired, and with proper process sequencing, the AAA can perform the pre-alignment step for more than one main AWA.

DETAILED DESCRIPTION

Figure 1:
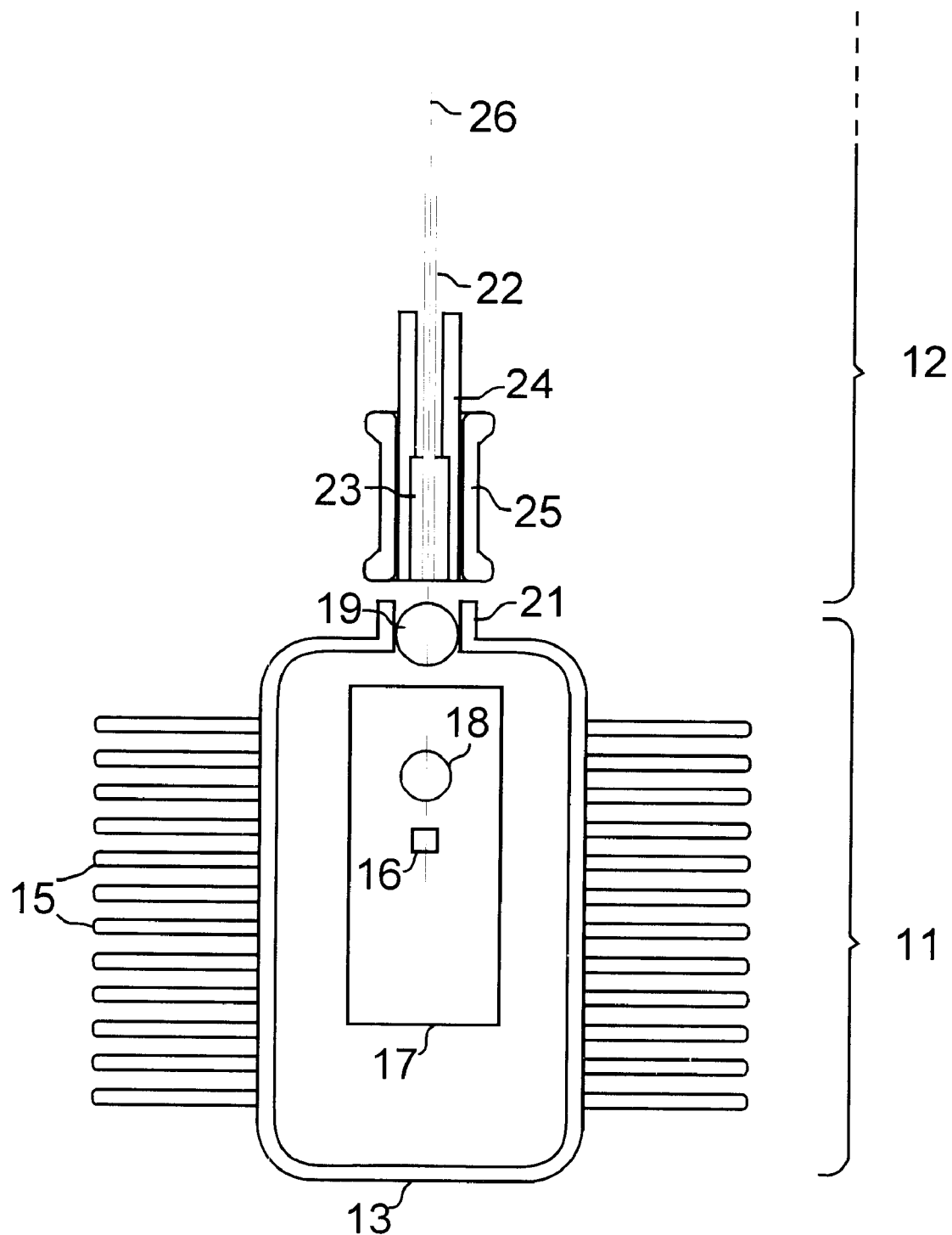
Fig. 1 is a schematic illustration of the coupling problem presented in a typical s/d optical package.

With reference to FIG. 1, a s/d module is shown generally at 11. The fiber pigtail is shown generally at 12. The s/d module comprises container 13, which may be of any suitable material such as plain carbon steels, stainless steels, Kovar, Alloy 42, ceramic/Kovar hybrids, et al. The active element in the module 11 is designated 16. This element in the embodiment shown is a laser diode but alternatively could be a photodetector. FIG. 1 shows a plurality of electrical leads 15 extending from the interior active device to the outside of the container 13. The active element is typically mounted on an optical bench or support substrate 17. The optics in the laser module comprise spherical lens 18, attached to the laser support, and spherical lens 19 in the entryway 21 of container 13. This arrangement is but one example of the optics that can be used in a typical s/d module.

The optical fiber pigtail 12 comprises optical fiber 22, shown with ferrule 23 affixed to the fiber end. The main body of the ferrule is typically ceramic or glass, which is molded or extruded, or machined, to provide a precise fit for fiber 22. See e.g. U.S. Pat. No. 4,850,670. The ferrule is fitted with an intermediate metal sleeve 24, and an outer metal collar sleeve 25, to allow attachment of the ferrule to container 13. The metal sleeve 25 is also used for Z-axis alignment. After precision alignment in the Z-direction, the ferrule is permanently attached to the metal sleeve 25 by welding intermediate sleeve 24 and the outer collar sleeve 25 together.

Figure 2:
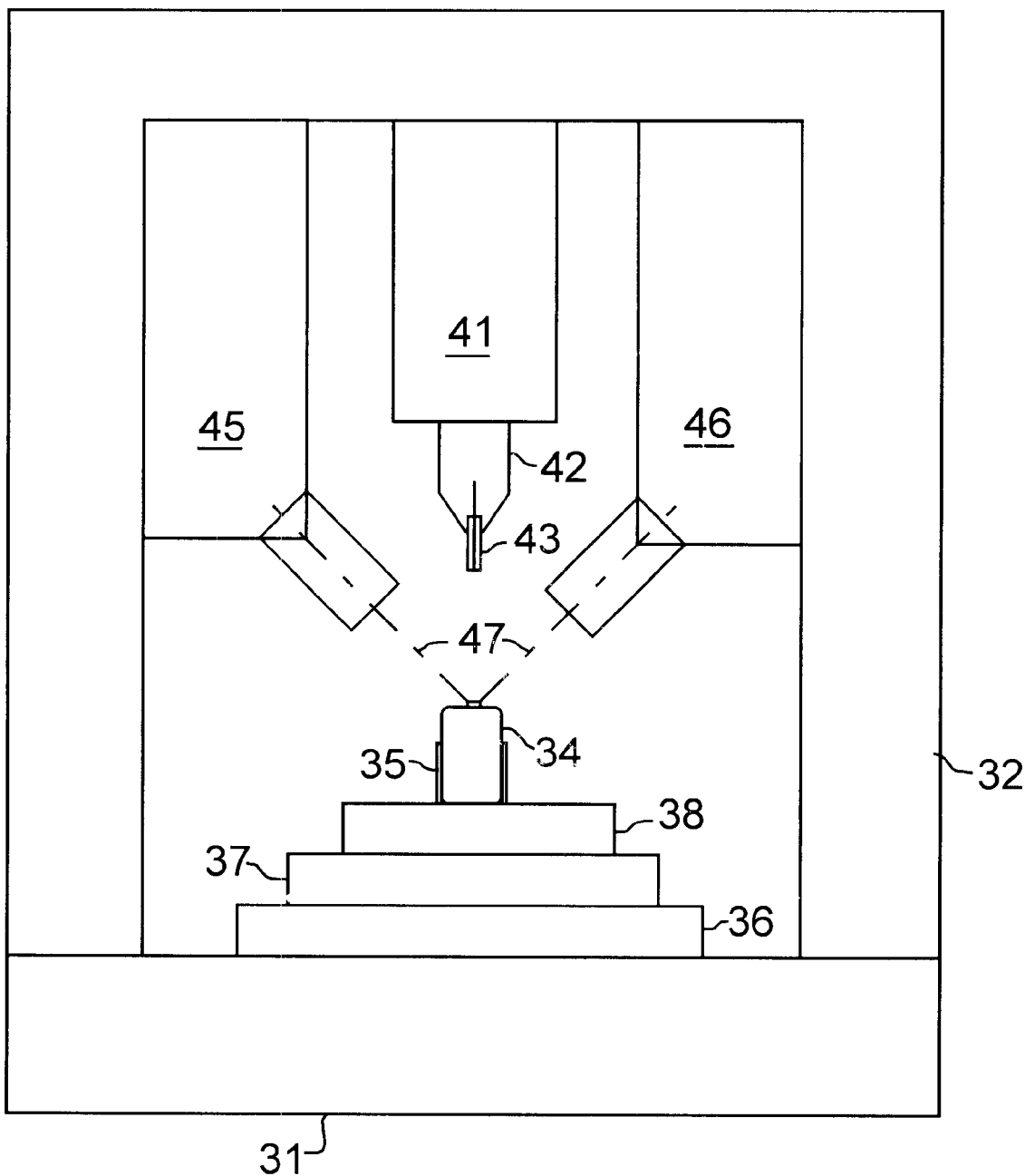
FIG. 2 is a schematic diagram of a typical laser AWA.

The essential aspect of attaching the components of the fiber pigtail 12 to the s/d module 11 is precision alignment of the components along the optical path represented in FIG. 1 by line 26. This is achieved using an alignment/welding apparatus (AWA) like that shown in FIG. 2. FIG. 2 shows an AWA comprising a stable base member 31, and a superstructure 32. As is typical of precision alignment equipment for electronic component processing, the base for the laser welding apparatus may be "floating" with respect to the surrounding environment to minimize the effect of building vibrations. The s/d module is shown at 34, positioned in a holding fixture 35. The s/d module is supported on multiple stages, which provide three degrees of freedom for moving the s/d module. The bottom stage 36 provides movement in the X-direction. The intermediate stage 37 provides movement in the Y-direction, and the top stage 38 is a theta stage that provides rotational movement, if needed. The relative position of these stages is interchangeable.

The Z-axis adjustment is provided by Z-stage 41, which comprises holder 42 which holds the ferrule 43 of the fiber pigtail. The Z-stage provides movement in the Z-direction but precisely maintains the X and Y positions of the pigtail throughout the process. In the apparatus shown, two laser welding heads are shown, at 45 and 46. The laser beams from these heads are represented by 47 and are focused on the spots to be welded after final positioning of the pigtail 41 and the s/d module 34.

Figure 3:
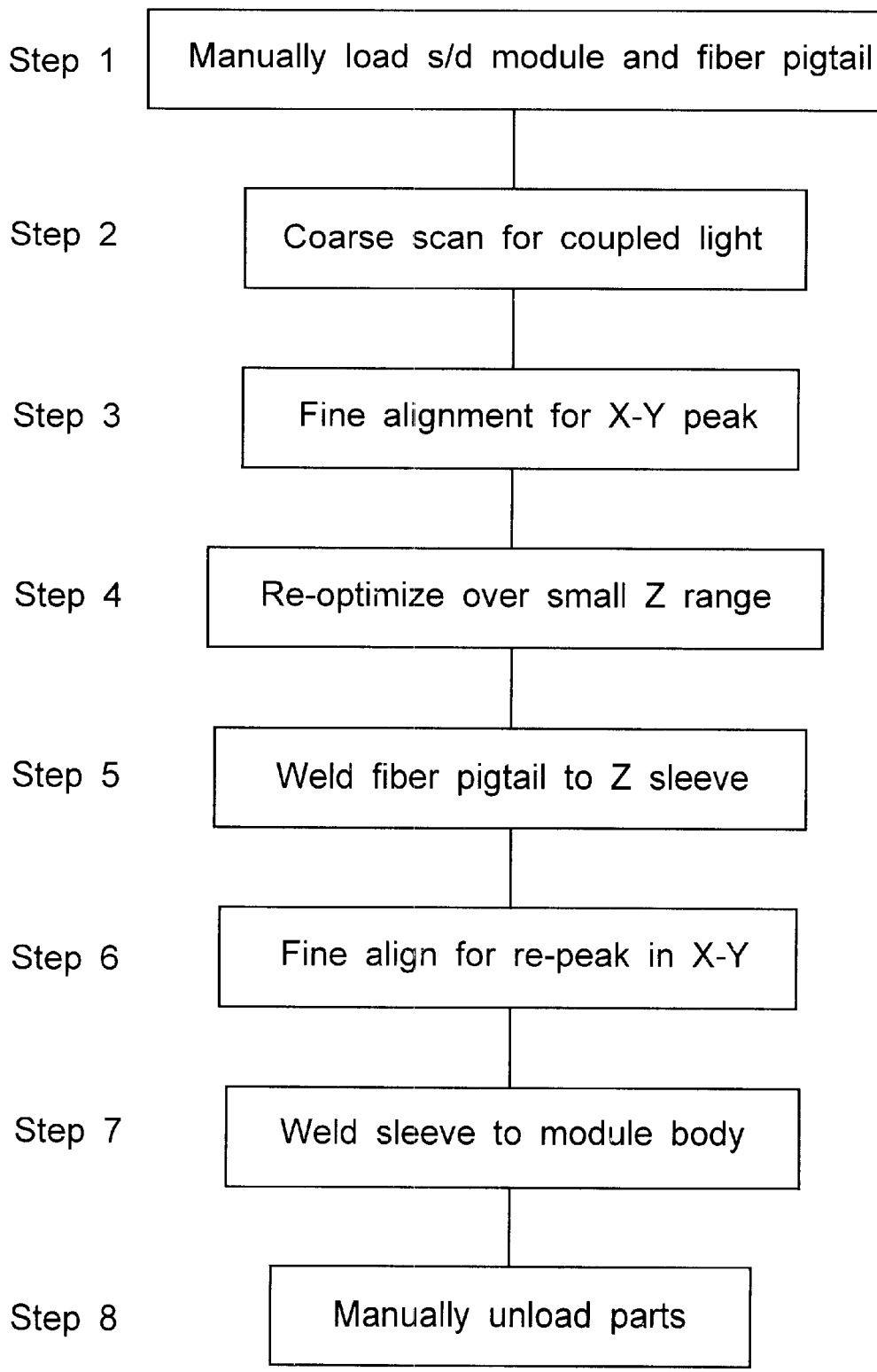
FIG. 3 is a flow diagram of the standard alignment and welding process.

A typical process sequence for the welding operation is shown in the flow diagram of FIG. 3. Step 1: The s/d module, Z-sleeve, and the optical fiber pigtail are mounted in the AWA as shown in FIG. 2. Step 2: The laser diode is activated and the s/d module is scanned across the estimated optical fiber core position to generate preliminary alignment information. This is a seek and find operation which produces X- and Y- coordinates for a minimum power level measured by the photodetector attached to the fiber pigtail. The s/d module is typically scanned over a relatively large field, e.g. 200×200 microns to find a beam spot approximately the size of the fiber core diameter. For a typical single mode fiber this is typically 8–10 microns. This scan operation, referred to in FIG. 3 as a coarse scan for coupled light, is especially time consuming. Once a threshold power level is found by the coarse scan, a fine X- direction and Y-direction alignment is performed, i.e. the s/d support stage is moved in small increments to find the optimum power output in the photodetector. This is represented in FIG. 3 by step 3. In some applications, the optical components can be permanently fixed together at this stage in the process. However, in the process embodiment shown here, this is still a preliminary alignment in that no attachment is made at this point. After completing the preliminary fine X-direction and Y-direction alignment, the final Z-direction alignment is performed as indicated in step 4 of FIG. 3. The Z-direction alignment is performed first because it, of the three (or four) degrees of freedom addressed by the alignment welding apparatus, the z-direction alignment is the least demanding. Tolerance on the X-direction and Y-direction alignments should be within a few microns, preferably <1 micron, while the Z-direction tolerance is significantly greater, typically by an order of magnitude. With reference to FIG. 2, the Z-direction head 41 is moved vertically until ferrule 43 aligns properly with the focus of the optics of s/d module 34. Laser beams 47 are then focused on the sleeve 25 (FIG. 1) and activated to weld the fiber ferrule to the sleeve (step 5).

Next, as indicated by step 6 of FIG. 3, final alignment in the X- and Y-directions is made. This alignment is a re-alignment of that made in step 3, and the X-Y data obtained in step 3 may be used to abbreviate step 6. Once the peak power to the photodiode is re-established, laser stages 45 and 46 are moved to focus the laser beams 47 on the junction between the s/d sleeve 21 and the ferrule sleeve 25. Attachment is made by laser welding these elements together as represented by step 7 of FIG. 3.

Each of these steps may be performed automatically by the AWA. These tools are available commercially from the Newport Corporation. In a typical step sequence that requires time t to complete, step 2 consumes approximately t/3. Reducing this time is the objective in the following description.

Figure 4:
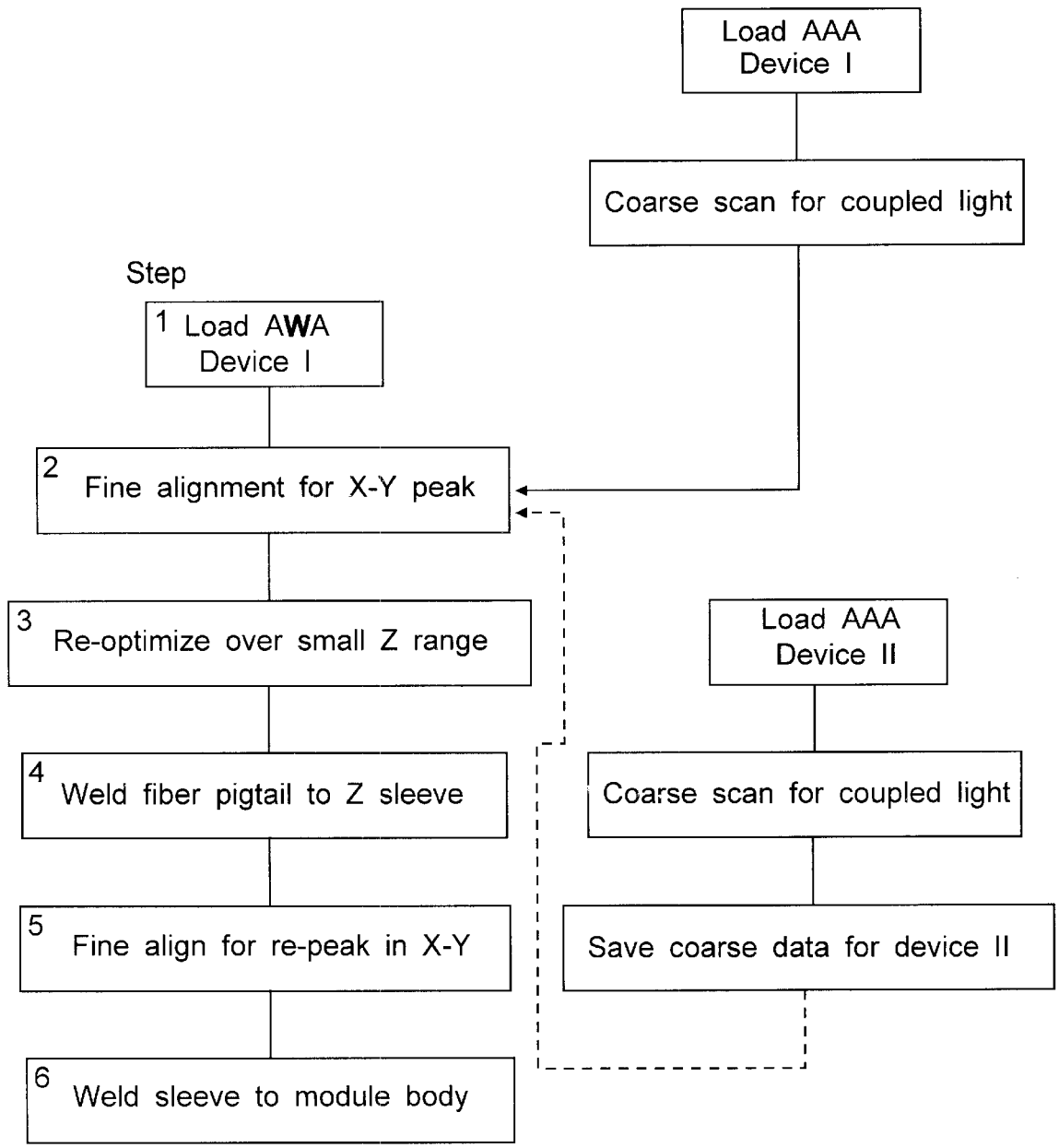
FIG. 4 is a flow diagram of the alignment and welding process of the invention.

The modification of the assembly operation according to the invention is illustrated by the step sequence shown in FIG. 4. Here step 1 is the same as in the sequence of FIG. 3. Step 2 of FIG. 3 however is removed from the sequence and taken offline as represented by the flow boxes on the right side of the figure. The s/d module is first aligned in the auxilliary alignment apparatus (AAA) device to obtain X- and Y- axis optical axis data. These data may be coarse or precise. Either choice will be effective for the purpose of the invention. The choice will depend in part on the precision of the AAA, and the ability to replicate the precise reference position of the device in the AAA when moved to the AWA. Preferably, the s/d module is securely mounted in the holding fixture (35 in FIG. 1) and placed in the AAA to obtain the X- and Y-axis alignment data. The same fixture, with the s/d module still securely mounted, is transferred to the AWA in step one of FIG. 4.

In FIG. 4, it is seen that step 2 in the AWA proceeds directly to fine X-Y alignment because the coarse X-Y alignment (step 2 of the sequence of FIG. 3) has already been performed off line by the AAA.

It will be recognized that on an absolute time scale, the time required for the sequential steps to process Device I in FIG. 4 is at least as long as the time required for all of the steps in FIG. 3. However, the time savings comes after start-up, when the X-Y alignment data for Device II is recorded while Device I is being processed. In principle, the alignment operation in the AAA will always be at least one device ahead of step 1 in the AWA. This is indicated by the alignment sequence for Device II. The alignment data is saved by the AAA apparatus, and fed back to the AWA when required for step 2 of the processing of Device II.

The AAA should provide essentially the same information that is normally generated and used by the AWA. That information consists of a number of coordinates for the s/d module and the optical fiber ferrule assembly. When that information is provided to the AWA at step 2 in FIG. 4, and the parts moved to those coordinates, significant coupled power will be observed, and the fine alignment of step 2 may commence. The remaining steps in the AWA sequence, i.e. steps 3–6, are the same or similar to those shown in FIG. 3.

In a high reliability system, two sources of error must be addressed. The first has to do with fixed offsets in the tooling of the AAA and the AWA. If a module placed in the AAA has a specific position and orientation relative to, say, a test fiber, when the module is moved to the AWA it should have the same relative position with respect to the optical fiber ferrule. There may be a consistent offset in coordinates due to built-in offsets between the mounting fixtures in the two machines. These fixed errors can easily be compensated for by using a test module in each of the machines, and learning (by physical measurement of dimensions plus some fiber searching) how much fiber offset should be introduced to obtain equal optical measurements in the two machines. This can be achieved either by designing the module body such that it always seats in the machine holders in a predictable manner (i.e. has useful reference surfaces) or, more likely, by clamping the part to a so-called kinematic mount, and transporting both the mount and the module from one machine to the other. Such kinematic mounts can be designed to provide repeatable re-positioning with an error of only a micron or so—within the acceptable range for the coarse alignment step.

Additional savings in equipment cost can be realized by sharing the AAA between two or more AWA apparatus. This can more easily be realized if the AAA is used just for coarse X-Y position data.

The term optical axis is used herein and in the claims below to define the position of the light beam between two aligned and properly functioning elements. In the two elements being coupled, both will have an optical axis. When data is generated showing the position of the optical axis of one of the components by the technique described it inherently shows the position of the optical axis of the other optical component.

The term alignment/attachment apparatus when used below is intended to describe the AWA as well as other apparatus that uses active alignment and provides means for permanently attaching at least two optical elements together. The term alignment apparatus, as used herein is intended to refer to an apparatus, like the AAA described above, that has alignment information capability but is inherently less costly than the alignment/attachment apparatus.

The term unit assemblies as used herein is intended to refer to the optical fiber ferrule elements and the s/d module in combination, and also to other combinations of elements that are aligned and permanently coupled together using the method of the invention.

The term optical fiber pigtail assembly is intended to mean a length of optical fiber (waveguide) with a ferrule at one end and, in a preferred case, one or more metal sleeves on the ferrule. The term light source is intended to mean a light emitting diode, in the preferred case, a laser diode, mounted on a substrate within a container. The term optical axis is intended to mean the core of the waveguide of the optical fiber at the ferrule end of the fiber, and/or the position of the beam of light emitted from the laser diode along the direction of propagation of the beam.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. A method for the manufacture of optical assemblies wherein a first optical element, comprising a light source and having a first optical axis, is coupled to a second optical element, comprising a waveguide and having a second optical axis, method comprising the steps of:
   a. mounting the first optical element on a movable x-y stage in an alignment apparatus, the alignment apparatus having means for detecting light,
   b. activating the light source of the first optical element,
   c. moving the x-y stage of the alignment apparatus while detecting light with the means for detecting light,
   d. generating approximate X-Y coordinates for the optical axis of the first optical element,
   e. removing the first optical element from the alignment apparatus,
   f. mounting the first optical element on a movable x-y stage in an alignment/attachment apparatus, the alignment/attachment apparatus having means for detecting light,
   g. mounting the second optical element in the alignment/attachment apparatus,
   h. activating the light source,
   i. aligning the optical axes of the first and second optical elements by moving the first optical element with respect to the second optical element while detecting light with the means for detecting light,
   j. attaching the first optical element to the second optical element.

2. A method for the manufacture of optical assemblies wherein a first optical element comprising a light source and having a first optical axis is coupled to a second optical element comprising a waveguide and having a second optical axis, method comprising the steps of:
   a. mounting the first optical element on a movable x-y stage in an alignment apparatus, the alignment apparatus having means for detecting light,
   b. activating the light source of the first optical element,
   c. moving the x-y stage of the alignment apparatus while detecting light with the means for detecting light,
   d. generating approximate X-Y coordinates for the optical axis of the first optical element,
   e. removing the first optical element from the alignment apparatus,
   f. mounting the first optical element on a movable x-y stage in an alignment/attachment apparatus, the alignment/attachment apparatus having means for detecting light,
   g. mounting the second optical element in the alignment/attachment apparatus, the second optical element being spaced from the first optical element in the Z-direction,
   h. activating the light source,
   i. transferring the approximate X-Y coordinates obtained in step d. from the alignment apparatus to the alignment/attachment apparatus,
   j. using the approximate X-Y coordinates from step d, performing a first alignment between the optical axes of the first and second optical elements,
   k. performing a second alignment between the optical axes of the first and second optical elements by moving the second optical element with respect to the first optical element while detecting light from the means for detecting light in the alignment/attachment apparatus,
   l. attaching the first optical element to the second optical element.

3. The method of claim 2 including, between step j and step l the additional step of moving the first optical element and the second optical element with respect to one another in the Z-axis to obtain a Z-axis alignment.

4. The method of claim 3 wherein the second optical element comprises an optical fiber pigtail.

5. The method of claim 4 wherein the optical fiber pigtail comprises an optical fiber inserted into a ferrule connector, and a Z-axis sleeve on the ferrule connector.

6. The method of claim 5 wherein, after the Z-axis alignment, the Z-axis sleeve is attached to the ferrule connector.

7. The method of claim 6 wherein the Z-axis sleeve is attached to the ferrule connector by laser welding.

8. The method of claim 1 wherein the first optical element is attached to the second optical element by laser welding.

* * * * *